United States Patent
D'Amato et al.

(10) Patent No.: US 9,821,804 B2
(45) Date of Patent: Nov. 21, 2017

(54) ENHANCED VEHICLE SPEED CONTROL (71) Applicant: Ford Global Technologies, LLC, Dearborn, MI (US)

(72) Inventors: Anthony Mario D'Amato, Canton, MI (US); Steven Joseph Szwabowski, Northville, MI (US); Jonathan Thomas Mullen, Lexington, KY (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 137 days.

(21) Appl. No.: 14/505,681

(22) Filed: Oct. 3, 2014

(65) Prior Publication Data

US 2016/0096526 A1    Apr. 7, 2016

(51) Int. Cl.
*B60W 30/14* (2006.01)
*B60W 50/08* (2012.01)
*B60W 50/00* (2006.01)

(52) U.S. Cl.
CPC ........ *B60W 30/143* (2013.01); *B60W 50/087* (2013.01); *B60K 2310/244* (2013.01); *B60W 2050/0089* (2013.01); *B60W 2510/0604* (2013.01); *B60W 2520/10* (2013.01); *B60W 2720/10* (2013.01)

(58) Field of Classification Search
None
See application file for complete search history.

(56) References Cited

U.S. PATENT DOCUMENTS

| 5,177,683 A | 1/1993 | Oo et al. |
| 5,775,293 A | 7/1998 | Kresse |
| 2009/0299595 A1 | 12/2009 | Harumoto et al. |

FOREIGN PATENT DOCUMENTS

| DE | 4123346 B4 | 4/2004 |
| DE | 10322697 A1 | 8/2004 |

OTHER PUBLICATIONS

Mikesell et al., "Options in Speed Tracking Control for Automotive Testing", *Proceedings of the 2012 ASEE North-Central Section Conference,* © 2012, American Society for Engineering Education, 8 pages.

*Primary Examiner* — Mussa A Shaawat
*Assistant Examiner* — Kyung Kim
(74) *Attorney, Agent, or Firm* — Frank A. MacKenzie; Bejin Bieneman PLC (57) ABSTRACT

A demand is identified based on input from a vehicle operator. Data is received providing a history of vehicle velocities. An estimated reference velocity is generated based at least on the velocity data. A final demand is generated based at least in part on a reference velocity indicated by the velocity control signal and the estimated reference velocity.

20 Claims, 6 Drawing Sheets

ENHANCED VEHICLE SPEED CONTROL

BACKGROUND

Typically, vehicle drivers tend to cause oscillations in vehicle speed about an intended target speed due to unintended perturbations of a vehicle control, e.g., an accelerator pedal. These perturbations result in reduced fuel economy and reduced passenger comfort. Although perturbations in driver demand, and thus vehicle speed, may be eliminated or at least greatly reduced with the use of existing cruise control systems, drivers are often reluctant to use cruise control in certain situations and/or use of cruise control may be impractical in certain situation. For example, a desired speed may be too low for cruise control, traffic congestion makes the use of cruise impossible or impractical, or use of cruise control may be unnerving for the driver, e.g., as may be the case with so-called "adaptive" cruise control. Moreover, some drivers prefer to remain in manual control of vehicle speed as a matter of preference. Accordingly, there is a need to be able to provide enhanced fuel economy and/or vehicle occupant comfort while maintaining the driver in a vehicle speed control loop.

DESCRIPTION

Introduction

A vehicle speed desired by the driver is referred to herein as a "reference speed." A "demand" or "driver demand" as used herein means at least one of an input and/or signal in a command chain in a vehicle including input and/or signaled quantities for a pedal position/torque request/desired air-mass/throttle valve position and/or acceleration.

Disclosed herein are systems and methods for estimating a reference speed, and for using the estimated reference speed in combination with a vehicle demand control, possibly in combination with other data, to reduce the effects of unwanted and/or unintended perturbations in the vehicle speed control. Further, the estimated reference speed may be used to identify, in real-time or substantially real-time, coefficients of a driver model that may be used in the driver compensation scheme to produce compensation with a more natural feel to the driver. In short, the presently disclosed subject matter provides a compensator in a vehicle speed control path that smoothes driver demand to obtain a final demand, and thereby provides for improved fuel economy and passenger comfort.

System Overview

Figure 1:
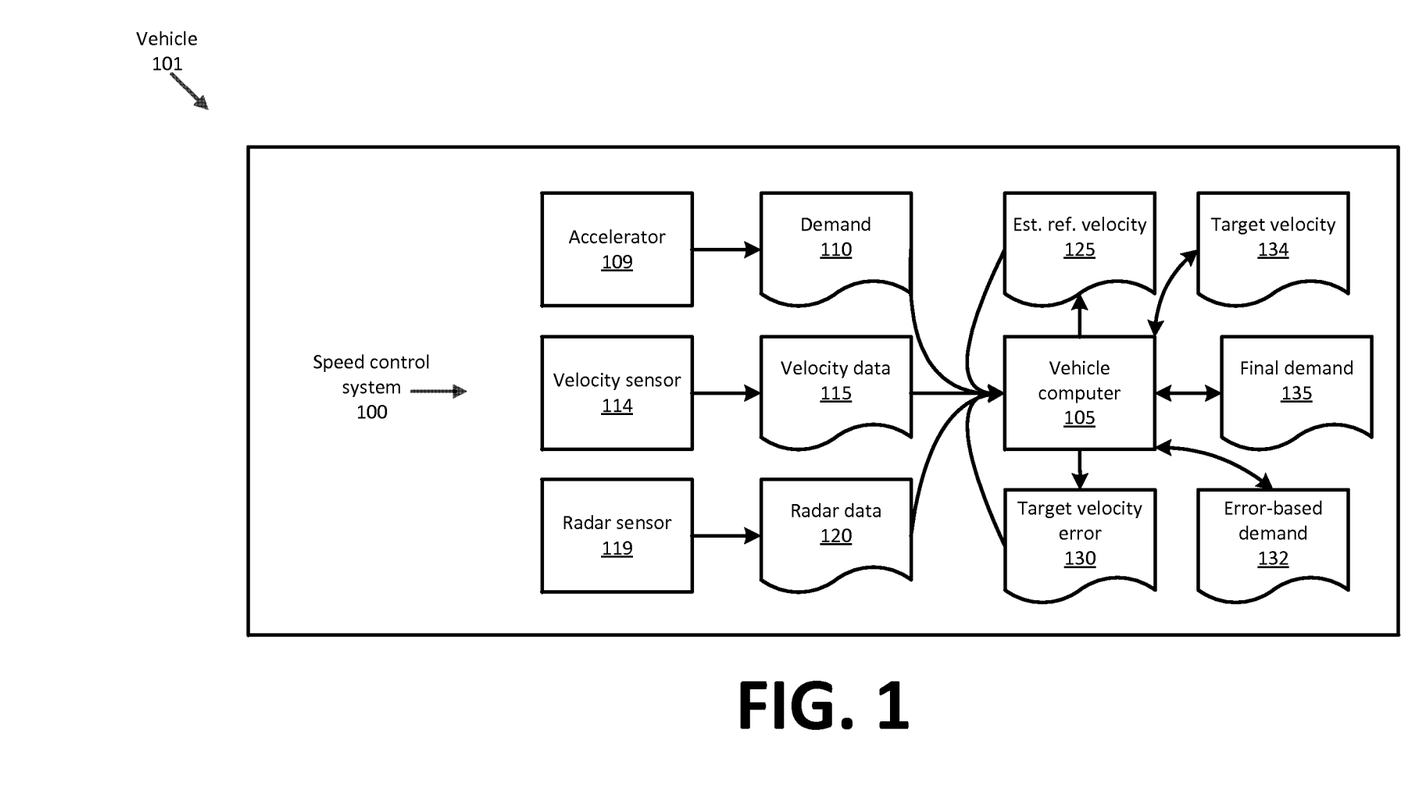
FIG. 1 is a block diagram of a system for enhanced vehicle speed control.

FIG. 1 is a block diagram of a system 100 for enhanced vehicle 101 speed control. As illustrated in FIG. 1, the system 100 is usually implemented in a vehicle 101, and various elements of the system 100 are elements or components in the vehicle 101.

A vehicle 101 computer 105 included in the system 100 for carrying out various operations, including as described herein, generally includes a processor and a memory, the memory including one or more forms of computer-readable media, and storing instructions executable by the processor for performing various operations, including as disclosed herein. The memory of the computer 105 further generally stores remote data received via various communications mechanisms; e.g., the computer 105 is generally configured for communications on a controller area network (CAN) bus or the like, and/or for using other wired or wireless protocols, e.g., Bluetooth, etc. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., e.g., controllers and sensors as discussed herein. Although one computer 105 is shown in FIG. 1 for ease of illustration, it is to be understood that the computer 105 could in fact, include, and various operations described herein could be carried out by, one or more computing devices, e.g., vehicle component controllers such as are known and/or a computing device dedicated to the system 100.

Via communications mechanisms such as discussed above, the computer 105 may receive and/or generate, calculate, etc. various data. For example, an accelerator 109 is generally provided with a sensor, measurement device, etc., as is known, for indicating a demand 110 (which as noted above could be an accelerator position or some other quantity) that may be used to regulate vehicle 101 speed. Note that, although the present disclosure often uses an accelerator position as exemplifying a driver demand 110, the system 100 could include, and could make use of, or other indicia of vehicle 101 speed, e.g., engine torque, wheel torque, engine acceleration, wheel acceleration, etc.

Further, a velocity sensor 114 may be used to provide velocity data 115 to the computer 105. A velocity sensor 114 is generally known, and moreover, as is known, vehicle 101 velocity data 115 is generally available via a communication mechanism such as discussed above, e.g., via CAN communications.

One or more radar sensor or sensors 119 may be used to provide radar data 120 to the computer 105. For example, a radar sensor or sensors 119 may be mounted on a front of the vehicle 101, and used to measure a distance, or a change in distance over time, between the vehicle 101 and a second vehicle, e.g., as known for use in so-called adaptive cruise control systems. Further, in addition or as an alternative to radar sensors 119, use could be made of a forward looking camera, LIDAR, vehicle-to-vehicle communications, vehicle-to-cloud-communications, etc.

As described further below, accelerator position data 110 and velocity data 115, and/or radar data 120, may be used by the computer 105 to generate an estimated reference velocity 125. While the accelerator position data 110 is conventionally used to indicate a reference velocity, the estimated reference velocity 125 takes into account further information, including generally a history of velocity data 115, e.g., represented in clusters or a moving average as described further below, to determine an estimate of a vehicle 101 velocity intended by a driver. Accordingly, a target velocity error 130 may be defined as a difference between the estimated reference velocity 125 and a reference velocity indicated by a demand 110. Further, the data 110, 115, 120, 125 may be used to generate a target velocity 134 and a final demand 135, as described further below. The final demand 135 may be provided to various vehicle 101 systems, e.g., an engine controller, e.g., based on a determined target velocity 134 for the vehicle 101 to attain or maintain.

Processing

Figure 2:
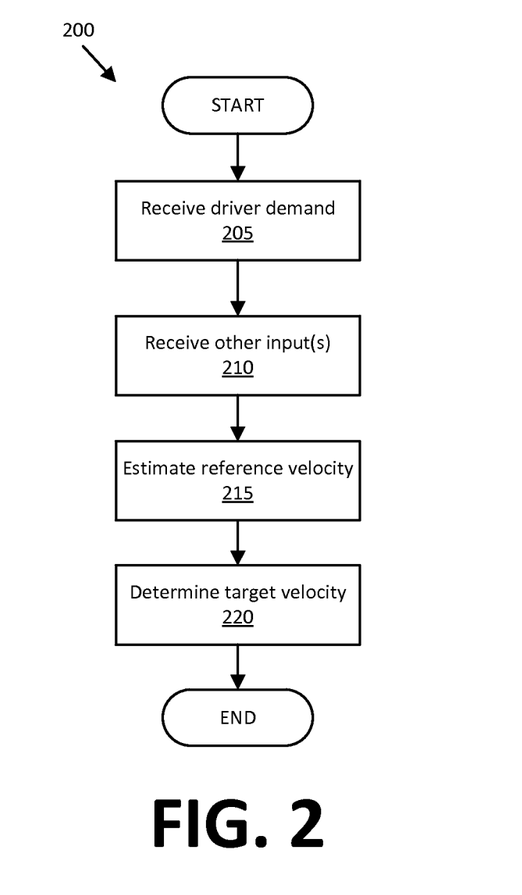
FIG. 2 is a process flow diagram illustrating an exemplary process for determining a final demand for a vehicle.

FIG. 2 is a process flow diagram illustrating an exemplary process 200 for determining a final demand 135 for a vehicle 101. The process 200 begins in a block 205, in which a vehicle 101 computer 105 receives a driver demand 110, e.g., an accelerator position, which may be used to determine a velocity of travel instructed for the vehicle 101. For example, an accelerator position demand 110 provides an indicia of a vehicle 101 speed intended by the driver.

Next, in a block 210, the computer 105 receives other inputs, including, at a minimum, velocity data 115 indicating a current speed (i.e., velocity) at which a vehicle 101 is traveling. Further, input received in the block 210 may include radar data 120, or other data, such as image data.

Figure 3:
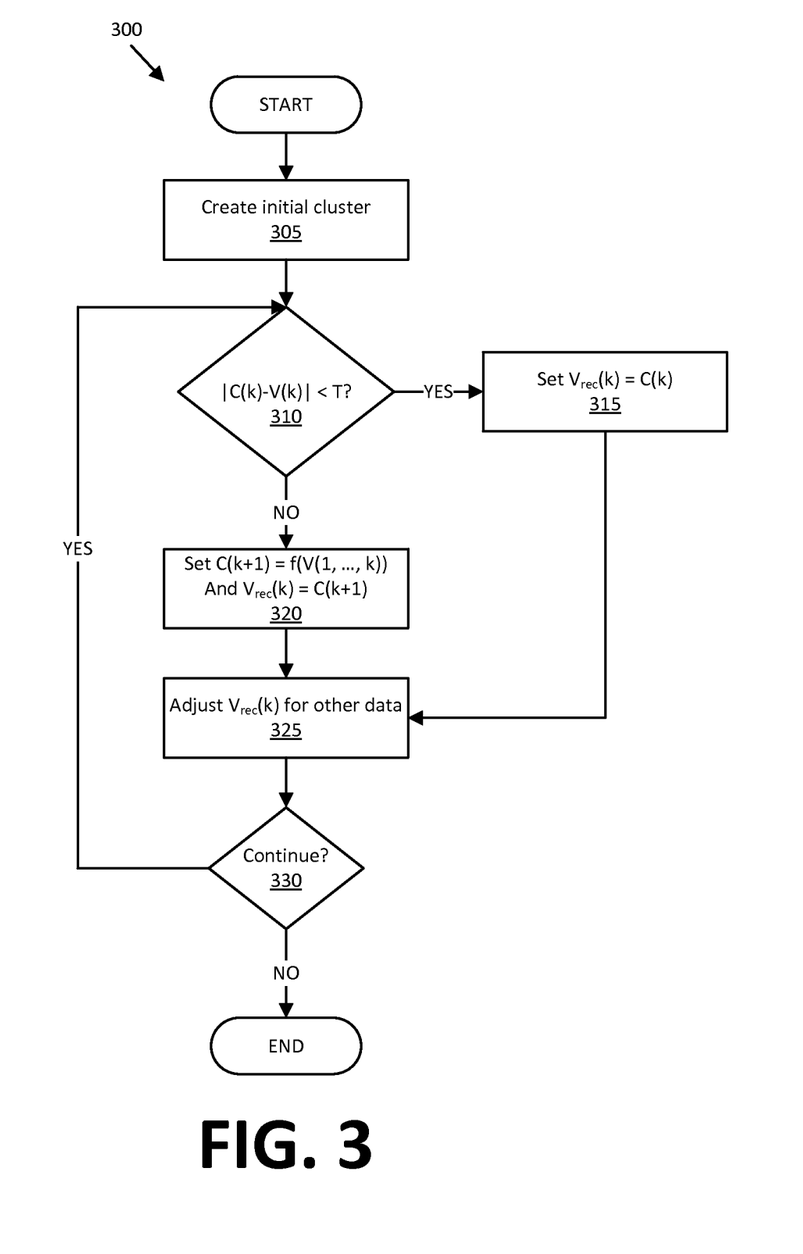
FIG. 3 is a process flow diagram illustrating a first exemplary sub-process of the process of FIG. 2 for determining an estimated reference velocity.
Figure 4:
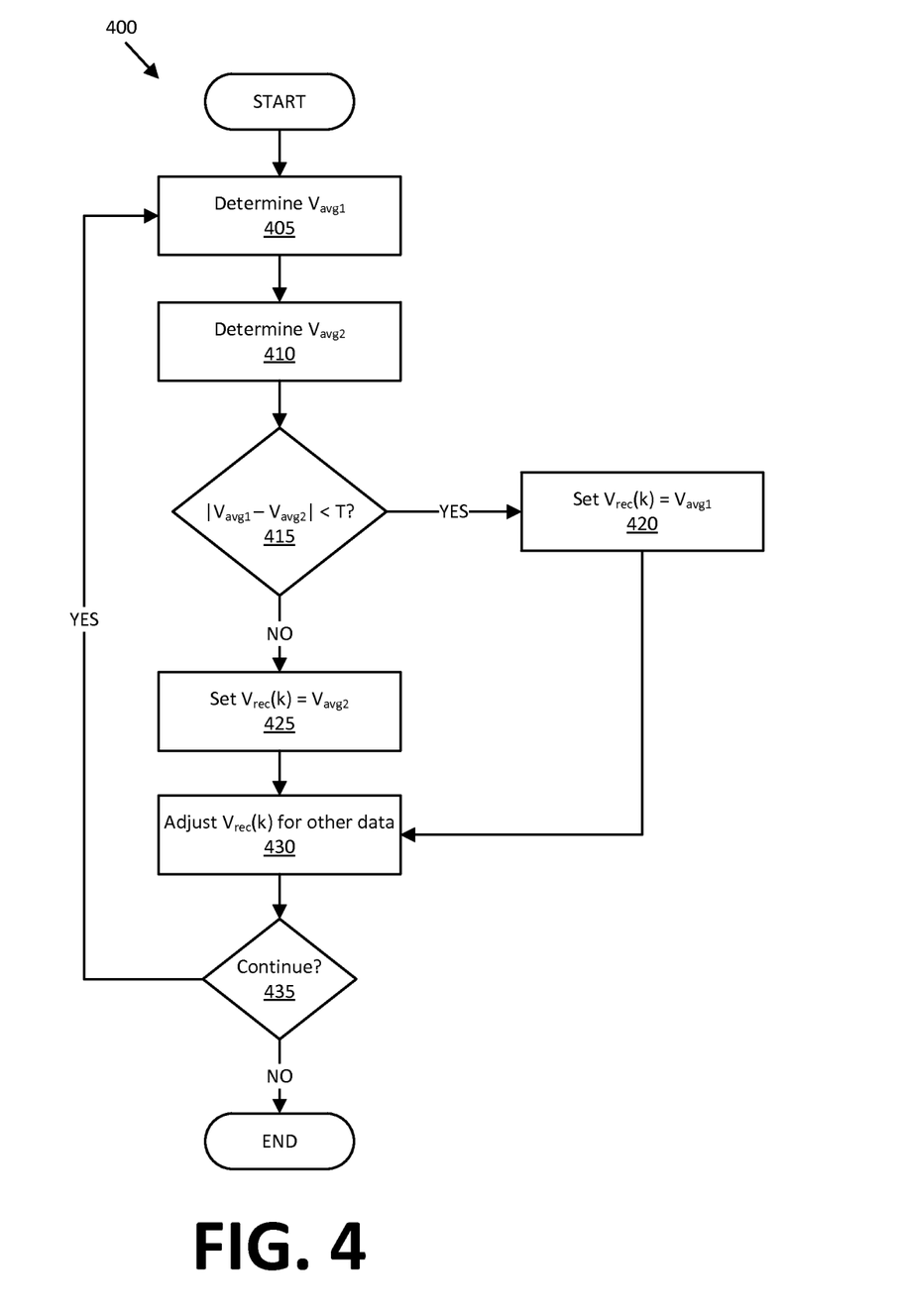
FIG. 4 is a process flow diagram illustrating a second exemplary sub-process of the process of FIG. 2 for determining an estimated reference velocity.

Next, in a block 215, the computer 105 generates an estimated reference velocity 125. FIGS. 3 and 4, discussed below, illustrate various possible processes 300, 400 by which the reference velocity 125 may be generated.

Figure 5:
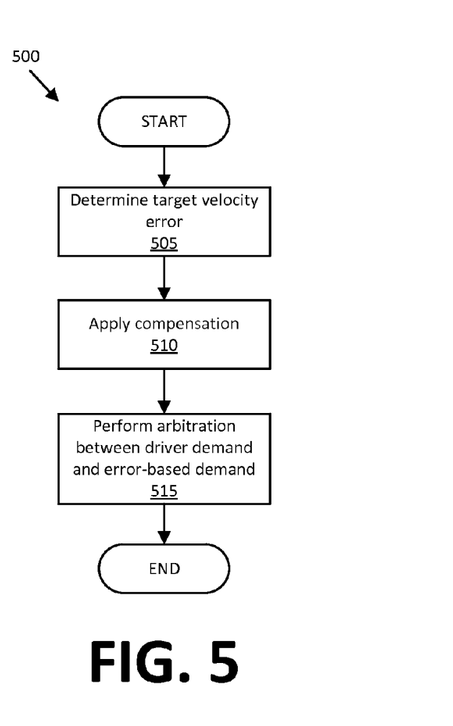
FIG. 5 is a process flow diagram illustrating an exemplary process sub-process of the process of FIG. 2 for determining a final demand for a vehicle.

Next, in a block 220, as described in more detail below, using the estimated reference velocity 125 and possibly also the input received in the block 210, the computer 105 generates a target velocity 134, which may then be provided to one or more vehicle 101 systems, e.g., as mentioned above, to an engine controller to determine a vehicle 101 final demand 135. FIG. 5 discusses an exemplary process 500 for determining the final demand 135. Further, FIG. 6 discusses an exemplary process 600 for adjusting an estimated reference velocity 125, which may be a prerequisite to adjusting a final demand 135.

Following the block 220, the process 200 ends.

FIG. 3 is a process flow diagram illustrating a first exemplary process 300 for determining an estimated reference velocity 125. The process 300 begins in a block 305, in which the computer 105 generates an initial cluster of vehicle 101 velocities. A cluster of vehicle 101 velocities includes a plurality of velocity data 115, where each datum 115 represents a vehicle 101 velocity at a particular moment in time, each of the data 115 in the cluster representing a vehicle 101 velocity that is within a predefined tolerance T of a median cluster velocity, sometimes referred to as the cluster center.

Figure 7:
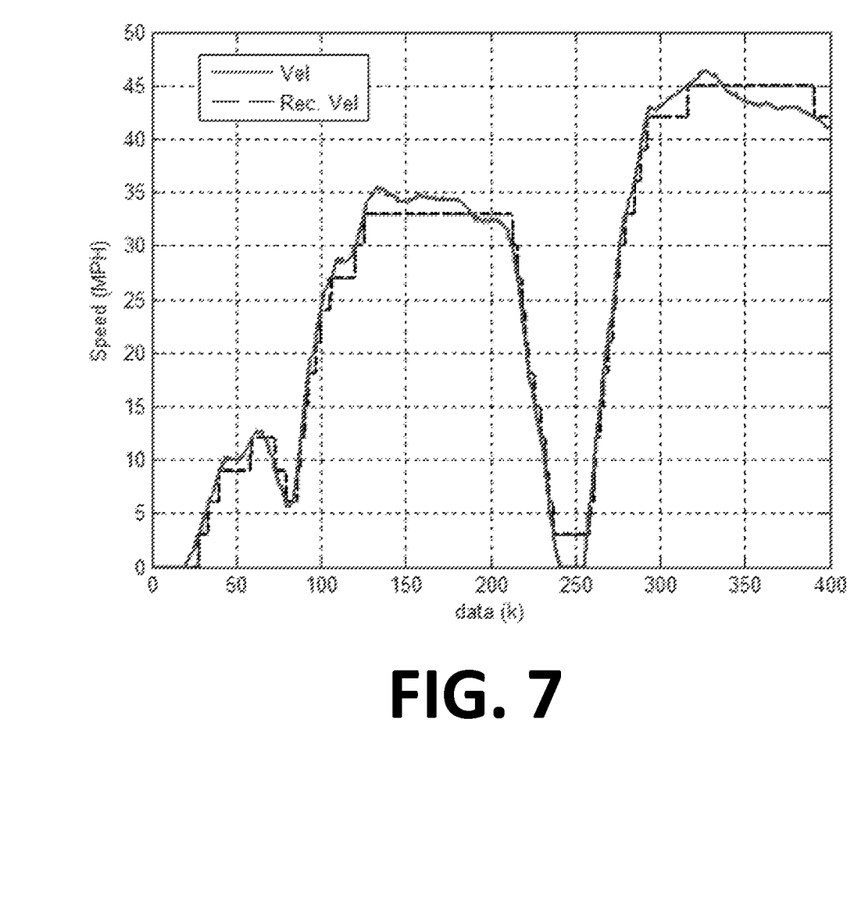
FIG. 7 illustrates graphs of actual and clustered vehicle velocities.

FIG. 7 illustrates graphs of an actual vehicle velocities ("Vel") and clustered, sometimes referred to as "reconstructed," vehicle velocities ("Vel rec"). The clustered or reconstructed velocity is the driver reference velocity. The clustering of the block 305 done in real-time or substantially real-time.

Next, following the block 305, in a block 310, the computer 105 compares the difference between a current vehicle velocity datum 115 V(k) and a current cluster velocity C(k), i.e., the cluster center, and determines whether this difference is less than the tolerance T. If yes, the process 300 proceeds to a block 315. If no, the process 300 proceeds to a block 320.

In the block 315, the computer 105 sets the estimated reference velocity 125 $V_{rec}(k)$ to be equal to the current cluster velocity C(k). That is, where a vehicle 101 is driving at a relatively steady speed, the cluster and the cluster center will not change, and the estimated reference velocity 125 will be maintained. Following the block 315, the process 300 proceeds to a block 325, or, in implementations where the block two 325 is omitted, to a block 330.

In the block 320, the computer 105 generates a new cluster center C(k+1) that is set to the current vehicle 101 velocity 115 V(k), and the estimated reference velocity 125 $V_{rec}(k)$ is set to the new cluster center C(k+1), i.e., the current vehicle 101 velocity 110 V(k). Following the block 320, the process 300 proceeds to the block 325, or, in implementations where the block 325 is omitted, to the block 330.

As alluded to above, the block 325 may be omitted. However, if the block 325 is included, then, in the block 325, the computer 105 may take into account data other than velocity data 115 in determining the estimated reference velocity 125. As mentioned above, radar data 120 may be used in determining the estimated reference velocity 125. For example, radar data 120 may indicate that an estimated reference velocity 125 as determined in one of the blocks 315, 320, should be adjusted because the velocity 125 would cause the vehicle 101 to be too close to or too far from a so-called "lead" vehicle, i.e., a second vehicle in front of the vehicle 101. Image data could be similarly used. In one implementation, radar data indicating a velocity of a lead vehicle, i.e., a vehicle traveling ahead of the vehicle 101, may be used to indicate the estimated reference velocity in lieu of clustered velocity data as described above.

Following the block 325 (or one of the blocks 315, 320), in a block 330, the computer 105 determines whether the process 300 should continue. For example, the vehicle 101 may stop, be powered off, etc., in which case the process 300 may end. Otherwise, the process 300 returns to the block 310 for evaluation of velocity data 115 gathered since the block 310 was last visited.

FIG. 4 is a process flow diagram illustrating a second exemplary process for determining an estimated reference velocity 125. The process 400 begins in a block 405, in which the computer 105 uses velocity data 115 to determine an average vehicle 101 velocity $V_{avg1}$ for a first period of time.

Next, in a block 410, the computer 105 uses velocity data 115 to determine an average vehicle 101 velocity $V_{avg2}$ for second period of time, the second period of time being less than the first period of time.

Next, in a block 415, the computer 105 determines whether a difference between the two average velocities $V_{avg1}, V_{avg2}$, is less than a predetermined tolerance T. If yes, a block 420 is executed next. If no, a block 425 is executed next.

In the block 420, the estimated reference velocity 125 $V_{rec}(k)$ is set to the previously-determined average velocity $V_{avg1}$. Following the block 420, the block 430 is executed or, in implementations omitting the block 430, the process 400 will proceed to the block 435.

In the block 425, the estimated reference velocity 125 $V_{rec}(k)$ is a set to the velocity $V_{avg2}$. Note that, on a first iteration of the process 400, the estimated reference velocity 125 $V_{rec}(k)$ is set to zero. In this case, the vehicle 101 is likely to be accelerating, and the difference between the two velocity averages is unlikely to be within the tolerance T. That is, on a first iteration of the process 400 the estimated reference velocity 125 $V_{rec}(k)$ is likely to be set to the velocity $V_{avg2}$. Following the block 425, the block 430 is executed or, in implementations omitting the block 430, the process 400 will proceed to the block 435.

As alluded to above, the block 430 may be omitted. However, if the block 430 is included, then, as in the block 325 discussed above, the computer 105 may take into account data other than velocity data 115 in determining the estimated reference velocity 125.

Following the block 430 (or one of the blocks 420, 425), in a block 430, the computer 105 determines whether the process 400 should continue. For example, the vehicle 101 may stop, be powered off, etc., in which case the process 400 may end. Otherwise, the process 400 returns to the block 405.

As mentioned above, an estimated reference velocity 125, e.g., determined according to one of the processes 300, 400, may be used to generate a final demand 135 that may be in turn used to govern vehicle 101 velocity. The final demand 135 may be generated in a variety of manners.

FIG. 5 is a process flow diagram illustrating an exemplary process 500 for determining a final demand 135 for a vehicle 101. The process 500 begins in a block 505, in which a target velocity error 130 e(k) is determined, i.e., by computing the difference between the target velocity 134 and measured vehicle velocity 115.

Next, in a block 510, an error-based demand u*(k) 132 is determined using a compensation mechanism. Various compensation mechanisms are possible, two examples of which are provided below.

A first exemplary compensation mechanism models actual driver behavior and then bases the error-based demand u*(k) 132 using averaged time varying coefficients associated with the actual or "true" driver behavior. For example, a model of true driver behavior may be provided with a time varying parameterization in a conventional manner, e.g., using least squares. A driver demand $u_{user}(k)$ having parameters $a_1 \ldots a_n$ as components could be indicated as follows:

$$u_{user}(k) \approx (a_1(k), \ldots a_n(k), e(k), \ldots e(k-n),$$
$$u_{user}(k-1), \ldots u_{user}(k-n)).$$

A compensation mechanism could "smooth" successive target velocities 135 for the "true" driver as follows:

$$u^*(k) = (\tilde{a}_1(k), \ldots \tilde{a}_n(k), e(k), \ldots e(k-n), u_{user}(k), \ldots$$
$$u_{user}(k-n), u^*(k-1), \ldots u^*(k-n)),$$

where $\tilde{a}(k) = \text{mean}(a(k), \ldots a(k-n))$.

A second exemplary compensation mechanism uses proportional-integral (PI) control, e.g., as follows:

$$u^*(k) = u^*(k-1) + K_p[e(k) - e(k-1)] + K_i T_s e(k),$$

where $K_p$ and $K_i$ are conventional parameters for proportional and integral gain, respectively, and $T_s$ represents a sample time.

In a block 515, which may be omitted by setting u(k)=u*(k), but which in some implementations follows the block 510, output of a compensator mechanism such as described with respect to the block 510, i.e., an error-based demand u*(k) 132605 is blended with a driver demand $u_{user}(k)$ indicated by pedal position data 110 to obtain a final demand 135. In one example, a blending scheme could use a time-varying scalar α within an interval [0, 1] such that the scalar α interpolates between the driver demand $u_{user}(k)$ indicated by the pedal position data 110 and the output of the compensator mechanism, the error-based demand u*(k). For example, the blending could be performed as follows:

$$u(k) = \alpha(k)^* u^*(k) + (1 - \alpha(k))^* u_{user}(k),$$

where $u_{user}(k)$ is a driver demand indicated by pedal position data 110, used to obtain u(k), the final demand 135.

Following the block 515, the process 500 ends.

Figure 6:
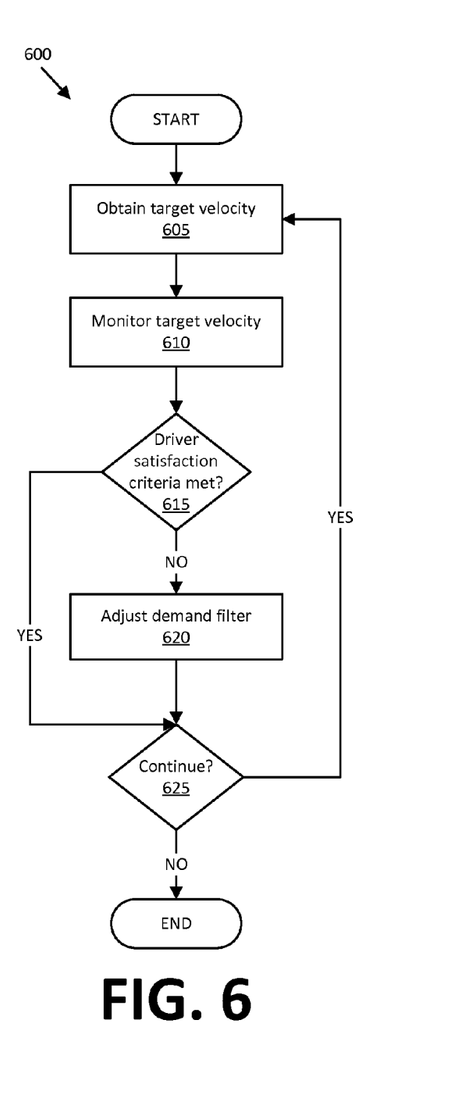
FIG. 6 is a process flow diagram illustrating an exemplary process for learning to adjust a final demand according to driver preferences.

Once a final demand u(k) 135 is determined as described above, it is possible to monitor a driver reaction to use of the final demand u(k) 135, thereby to prevent driver dissatisfaction, discomfort, etc. In other words, the system 100 can include a process whereby the computer 105 learns to make adjustments to use of the target velocity 135 for a particular driver. FIG. 6 is a process flow diagram illustrating an exemplary process 600 for learning to adjust the target velocity 134 according to driver preferences for improved driver satisfaction.

The process 600 begins in a block 605, in which the computer 105 retrieves the target velocity 134, e.g., determined as described above.

Next, in a block 610, the computer 105 monitors the target velocity 134 according to driver input, e.g., the accelerator position 110. A goal of this monitoring is to determine whether the driver perturbations of a speed control, e.g., changes in position 110 of the accelerator 109, indicate an intent of the driver to alter the speed of the vehicle 101, or are simply incidental perturbations, e.g., such as may be caused by inadvertent movements of a driver's foot. For example, greater perturbations may indicate driver dissatisfaction with target velocities 135, and hence may indicate that the estimated reference velocity 125 should be adjusted. That is, a greater degree of driver input, e.g., where the driver moves a vehicle 101 accelerator 109 in a manner to greatly increase or reduce vehicle 101 speed, resulting in a larger estimated reference velocity 125, may indicate driver dissatisfaction with target velocities 135 being determined by the computer 105. For example, if a driver demand 110 signal, e.g., based on the accelerator position, indicates a change in demand 110 that is different from the final demand u(k) 135 by some tolerance, e.g., a standard deviation, driver dissatisfaction with the target velocity 134 could be indicated.

Accordingly, in a block 615, following the block 610, the computer 105 determines whether driver satisfaction criteria are met. For example, if a driver has provided inputs that, as indicated by the filter applied in the block 610, indicate driver dissatisfaction with a target velocity or velocities 134 being determined by the computer 105, it may be determined that driver satisfaction criteria are not met.

In general, driver satisfaction criteria, that is, whether the driver is likely to continue to be satisfied with a current configuration or whether a change is required, can be determined by direct or indirect mechanisms. A direct mechanism uses driver inputs such as accelerator and brake pedal inputs. An indirect mechanism uses vehicle response parameters like torque converter lock status, desired transmission gear ratio change, or deceleration rate. For example, a deviation of more than a standard deviation from the current average accelerator pedal 109 position 110 or alternatively information from the transmission control system regarding its intention to unlock the torque converter or to request a downshift can be used to indicate the driver's need to regain accelerator pedal 109 responsiveness.

If driver satisfaction criteria are not met, then a block 620 is executed next. Otherwise, the process 600 proceeds to a block 625.

In the block 620, the computer 105 adjusts a filter or filters being applied to driver demand 110. In one implementation, adjustments are made to the time-varying scalar α applied as described above with respect to the block 515. For example, adjustments could be made to increase sensitivity to changes in pedal position 110 based on a detected driver dissatisfaction with target velocities 134. Further, if a driver input was severe, e.g., more than three standard deviations from a cluster velocity, then a filter could be removed altogether, i.e., a final demand could be based solely on driver input.

In the block 625, the computer 105 determines whether the process 600 should continue. For example, the vehicle 101 may stop, be powered off, etc., in which case the process 600 may end. Otherwise, the process 600 returns to the block 605.

CONCLUSION

With respect to the meaning of various terms used herein, "speed" and "velocity" are used interchangeably to refer to an amount of distance traveled per unit of time (e.g., miles per hour, kilometers per hour, etc.). As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computing device that includes a processor and a memory, the memory storing instruction executable by the processor such that the computing device is programmed to:
   receive a velocity control signal based on a driver demand;
   receive data providing a history of vehicle velocities;
   generate an estimate reference velocity based at least on the velocity data;
   generate a final demand based at least in part on a reference velocity indicated by the velocity control signal and the estimated reference velocity; and
   provide the final demand to one or more vehicle systems to control vehicle velocity.

2. The system of claim 1, wherein the computing device is further programmed to determine a reference velocity error that is a difference between the reference velocity and the estimated reference velocity.

3. The system of claim 2, wherein the computing device is further programmed to use the reference velocity error in a compensation scheme that modifies the reference velocity to obtain the final demand.

4. The system of claim 3, wherein the computing device is further programmed to modify the final demand resulting from the compensation scheme by blending the velocity control signal and the final demand resulting from the compensation scheme.

5. The system of claim 1, wherein the computing device is further programmed to generate the estimated reference velocity based in part on sensor data.

6. The system of claim 5, wherein the computing device is further programmed to replace the estimated reference velocity based at least on the velocity data with an estimated reference velocity based on the sensor data.

7. The system of claim 5, wherein the sensor data is at least one of radar data and image data.

8. The system of claim 1, wherein the velocity control signal is based on a position of a vehicle throttle control.

9. The system of claim 1, wherein the computing device is further programmed to use the reference velocity and the estimated reference velocity to determine whether to adjust the estimated reference velocity based on perturbations of a speed control.

10. The system of claim 9, wherein the computing device is further programmed to adjust the final demand after adjusting the estimated reference velocity.

11. A method, comprising:
receiving a velocity control signal based on a driver demand;
receiving data providing a history of vehicle velocities;
generating an estimated reference velocity based at least on the velocity data;
generating a final demand based at least in part on a reference velocity indicated by the velocity control signal and the estimated reference velocity; and
providing the final demand to one or more vehicle systems to control vehicle velocity.

12. The method of claim 11, further comprising determining a reference velocity error that is a difference between the reference velocity and the estimated reference velocity.

13. The method of claim 12, further comprising using the reference velocity error in a compensation scheme that modifies the reference velocity to obtain the final demand.

14. The method of claim 13, further comprising modifying the final demand resulting from the compensation scheme by blending the velocity control signal and the final demand resulting from the compensation scheme.

15. The method of claim 12, further comprising replacing the estimated reference velocity based at least on the velocity data with an estimated reference velocity based on the data providing a history of vehicle velocities.

16. The method of claim 12, wherein the data providing a history of vehicle velocities is at least one of radar data and image data.

17. The method of claim 11, further comprising generating the estimated reference velocity based in part on sensor data.

18. The method of claim 11, wherein the velocity control signal is based on a position of a vehicle throttle control.

19. The method of claim 11, further comprising using the reference velocity and the estimated reference velocity to determine whether to adjust the estimated reference velocity based on perturbations of a speed control.

20. The method of claim 19, further comprising adjusting the final demand after adjusting the estimated reference velocity.

* * * * *